(12) United States Patent
Gaddis et al.

(10) Patent No.: US 6,648,341 B1
(45) Date of Patent: Nov. 18, 2003

(54) CHUCK WITH HELICAL JAW BITE

(75) Inventors: Benjamin A. Gaddis, Clemson, SC (US); Phillip A. King, Bonner Springs, KS (US)

(73) Assignee: Power Tool Holders Incorporated, Christiana, DE (US)

( * ) Notice: Subject to any disclaimer, the term of this patent is extended or adjusted under 35 U.S.C. 154(b) by 0 days.

(21) Appl. No.: 09/938,779

(22) Filed: Aug. 24, 2001

(51) Int. Cl.⁷ ............................................. B23B 31/12
(52) U.S. Cl. ......................... 279/60; 279/61; 279/123; 279/902; 451/222
(58) Field of Search ..................... 279/60–65, 43.6, 279/123, 152, 7, 46.6; 451/222, 51, 61

(56) References Cited

U.S. PATENT DOCUMENTS

| | | | | |
|---|---|---|---|---|
| 928,180 A | * | 7/1909 | Church | 279/60 |
| 1,857,012 A | * | 5/1932 | Corley | 279/123 |
| 2,214,241 A | * | 9/1940 | Baxendale | 279/46.3 |
| 2,550,871 A | * | 5/1951 | Sharp | 279/61 |
| 3,850,077 A | * | 11/1974 | Garrett | 451/222 |
| 4,996,758 A | * | 3/1991 | Meredith et al. | 279/123 |
| 5,286,041 A | * | 2/1994 | Rohm | 279/60 |
| 5,816,584 A | * | 10/1998 | Miles et al. | 279/62 |
| 6,022,029 A | * | 2/2000 | Sakamaki | 279/60 |
| 6,354,605 B1 | * | 3/2002 | Aultman | 279/60 |
| 6,428,018 B1 | * | 8/2002 | Aultman et al. | 279/61 |

* cited by examiner

*Primary Examiner*—Steven C. Bishop
(74) *Attorney, Agent, or Firm*—Nelson Mullins Riley & Scarborough, LLP

(57) ABSTRACT

A chuck for use with a manual or powered driver having a rotatable drive shaft includes a generally cylindrical body having a nose section and a tail section. The tail section is configured to rotate with the drive shaft and the nose section has an axial bore formed therein. A plurality of jaws are movably disposed with respect to the body toward and away from the axial bore. Each jaw includes a back surface and a tool engaging surface opposite the back surface. The tool engaging surfaces are disposed facing generally parallel to the axis of the axial bore and a plurality of grinds are defined across each tool engaging surfaces to form a helical pattern on the tool engaging jaw surfaces when the tool engaging surfaces are disposed at a predetermined position with respect to the axis of the axial bore.

20 Claims, 13 Drawing Sheets

CHUCK WITH HELICAL JAW BITE

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well-known. Although twist drills are the most common tools used with such drivers, the tools may also comprise screwdrivers, nut drivers, burrs, mounted grinding stones, and other cutting or abrading tools. Since the tools may have shanks of varying diameter or may have a polygonal cross-section, the device is usually provided with a chuck that is adjustable over a relatively wide range. The chuck may be attached to the driver by a threaded or tapered bore.

A wide variety of chucks have been developed in the art. In one form of chuck, three jaws spaced circumferentially approximately 120 degrees apart from each other are constrained by angularly disposed passageways in a body attached to the driveshaft. The chuck is configured so that rotation of the body in one direction with respect to a constrained nut forces the jaws into or away from a gripping relationship with a tool shank. Such a chuck may be keyless if it can be tightened or loosened by manual rotation. Examples of such chucks are disclosed in U.S. Pat. Nos. 5,011,167, 5,125,673, 5,193,824, and 5,816,584, each of which is commonly assigned to the present assignee and the entire disclosures of which are incorporated by reference herein. Various configurations of keyless chucks are known in the art and are desirable for a variety of applications.

FIG. 3A illustrates, in cross-section, a chuck jaw construction in which each of three jaws 200 includes a back surface 202 and an opposing tool engaging surface formed by a ridge 204 disposed generally parallel to the chuck axis. Two generally planar side surfaces 206 extend from ridge 204 to the back surface. The side surfaces 206 on each jaw 200 define an angle of approximately 120 degrees extending through the jaw. Thus, each side surface on a jaw 200 is generally parallel to a side surface of an adjacent jaw. When the chuck is moved to its fully closed position as shown in FIG. 3A, the jaw side surfaces abut each other. FIG. 3B is a side view of a prior art jaw 200 having threads 234 and a tool engaging jaw face 225. FIG. 3C is another prior art chuck jaw having threads 234, a tool engaging jaw face 225, and serrations 227 in face 225. Serrated jaws typically have a decreased surface area to grip the tool and, therefore, apply a greater force per square inch than a non-serrated jaw face, all other factors being equal.

Other tool engaging surfaces are known. For example, the tool engaging surface may be formed by an inner ridge parallel to the chuck axis and two outer ridges parallel to the inner ridge. A pair of respective troughs sit between the inner ridge and the outer ridges so that the jaw's cross-section is in the shape of a "W." Generally, side surfaces that extend from the outer ridges to the jaw's back surface define a 120 degree angle between them through the jaw so that each side surface is parallel to the side surface of its adjacent jaw.

It is also known to grind the surfaces of chuck jaws in an assembled chuck to ensure that a tool shank gripped by the chuck jaws will be centered on the chuck axis. A grinding burr may be centered on the chuck axis to grind each jaw simultaneously as the assembled chuck moves axially with respect to the grinding burr.

Various configurations of keyless chucks and chuck jaws are known in the art and are desirable in a variety of applications.

SUMMARY OF THE INVENTION

The present invention recognizes and addresses disadvantages of prior art construction and methods.

Accordingly, it is an object of the present invention to provide an improved chuck jaw for use with a powered driver.

It is a more particular object of the present invention to provide an improved method of imparting a grind into a tool engaging jaw face in an assembled chuck.

It is a further object of the present invention to provide a method of imparting a helical grind to the tool engaging jaw faces of an assembled chuck in essentially a one-step process.

These and other objects are achieved by a chuck for use with a manual or powered driver having a rotatable drive shaft. The chuck includes a generally cylindrical body having a nose section and a tail section. The tail section is configured to rotate with the drive shaft and the nose section has an axial bore formed therein. A plurality of jaws are movably disposed with respect to the body toward and away from the axial bore. Each jaw includes a back surface and a tool engaging surface opposite the back surface. The tool engaging surfaces are disposed facing generally parallel to the axis of the axial bore and a plurality of grinds are defined across each tool engaging surface to form a helical pattern on the chuck jaw when the tool engaging surfaces are disposed at a predetermined position with respect to the axis of the axial bore.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
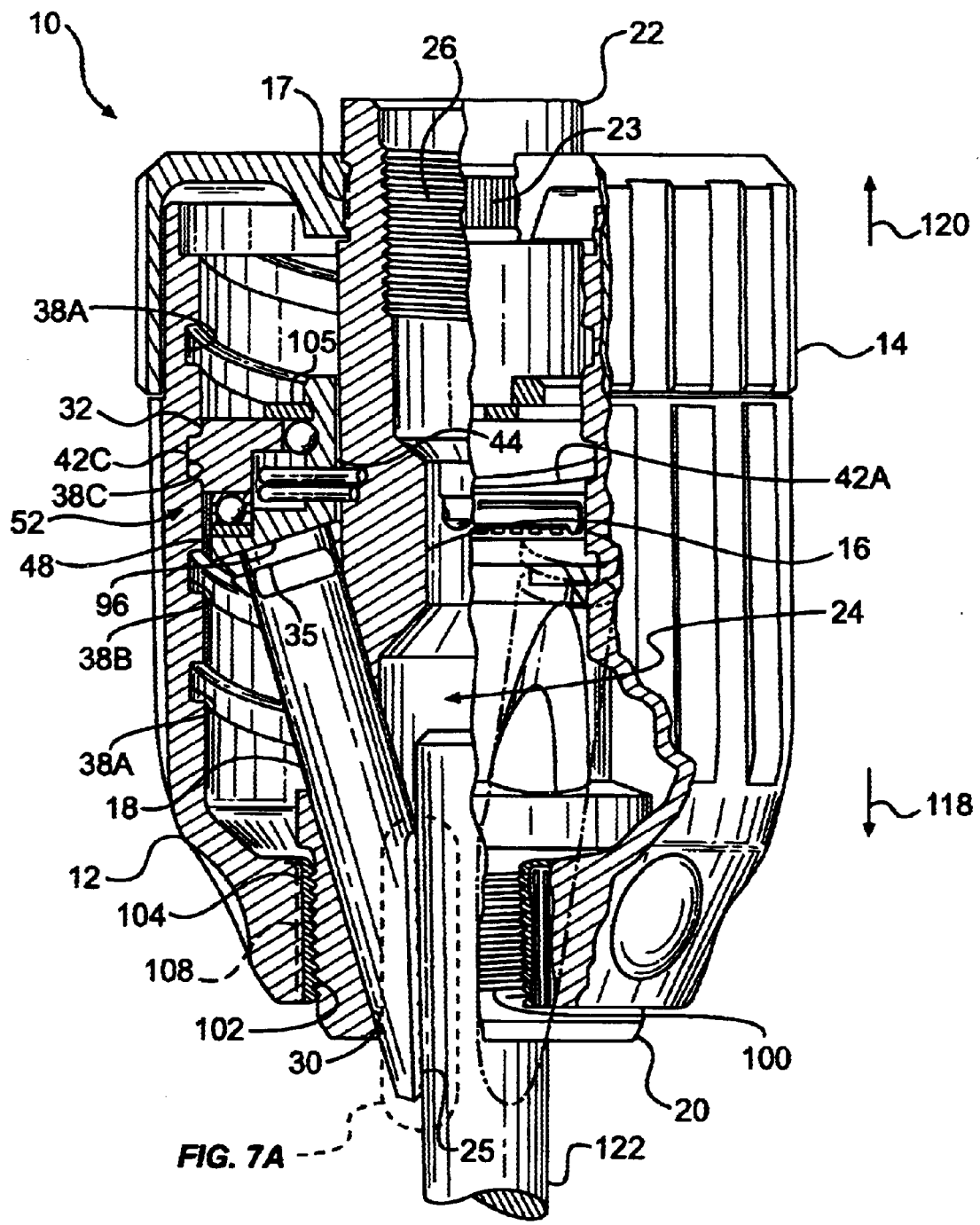
FIG. 1 is a plan view, partly in section, of a chuck constructed in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, a chuck 10 includes a front sleeve 12, an optional rear sleeve 14, a body 16 and jaws 18. Body 16 is generally cylindrical in shape and includes a nose or forward section 20 and a tail or rearward section 22. An axial bore 24 is formed in nose section 20 and is somewhat larger than the largest tool shank that the chuck is designed to accommodate. A threaded bore 26 is formed in tail section 22 and is of a standard size to mate with the drive shaft of a powered or hand driver (not shown). The bores 24 and 26 may communicate at a central region of body 16. While a threaded bore 26 is described, such bore may be replaced with a tapered bore of a standard size to mate and rotate with a tapered drive shaft. Furthermore, the body may be formed integrally with the drive shaft.

A plurality of passageways 30 are formed in body nose section 20 to accommodate each jaw 18. Preferably, three jaws 18 are employed, and each jaw is separated from the adjacent jaw by an arc of approximately 120 degrees. The axes of passageways 30 and jaws 18 are angled with respect to a chuck axis 31 (FIG. 2A) but intersect the axis at a common point ahead of chuck body 16. Each jaw 18 has a tool engaging surface 25 that is generally parallel to axis 31 of axial bore 24. Each jaw 18 also defines a rearward end 35 that engages within a respective slot 96 (FIG. 2B) defined in a thrust plate 46 so that the jaws are held to and driven by the thrust plate.

Tail section 22 can include a rear cylindrical portion having a knurled surface 23 thereon for receipt of optional rear sleeve 14. Rear sleeve 14 may be pressed onto the knurled surface at 17 or could be retained in place by press fit without knurling or by use of a key, a snap ring, or the like.

The outer circumferential surface of sleeve 12 may be knurled or may be provided with longitudinal ribs or other protrusions to enable the operator to grip it securely. In like manner, the circumferential surface of rear sleeve 14, if employed, may be knurled or ribbed if desired. The front and rear sleeves may be fabricated from a structural plastic such as poloycarbonate, a filled polypropylene, for example glass-filled. polypropylene, or a blend of structural plastic materials.

Figure 2A:
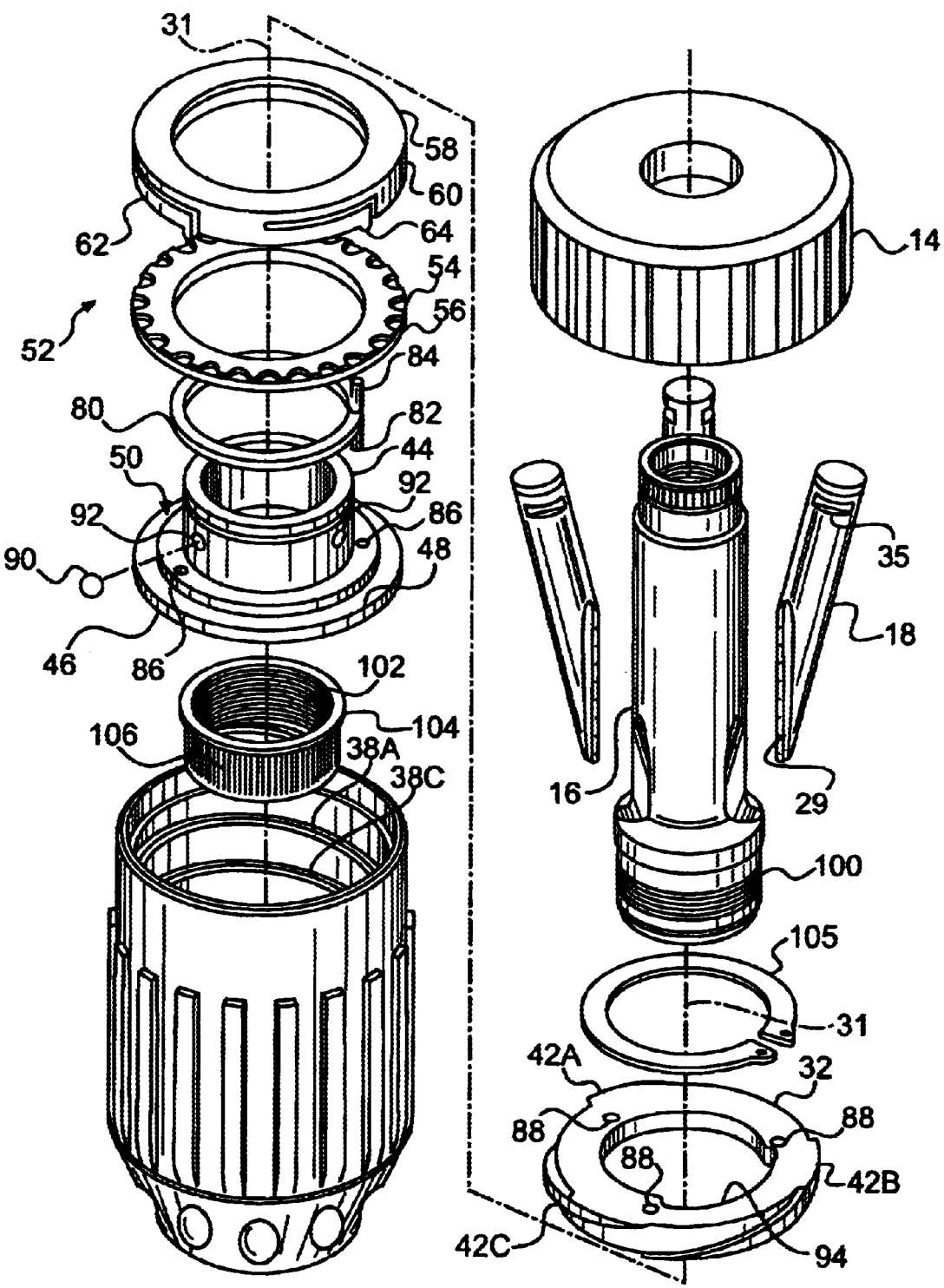
FIG. 2A is an exploded view of portions of the chuck of FIG. 1.

The interior surface of sleeve 12 defines three squared female threads 38A, 38B, and 38C. Referring also to FIG. 2A, a nut 32 includes three male threads, 42A, 42B and 42C that are received in threads 38A, 38B, and 38C, respectively. As described in more detail below, nut 32 can rotate with respect to body 16 over a limited arc. In one preferred embodiment, sleeve threads 38A, 38B, and 38C, and nut threads 42A, 42B, and 42C provide a one pitch configuration along the length of sleeve 12 in that one complete rotation between sleeve 12 and nut 32 moves the nut approximately one inch within the sleeve.

Three female threads and three male threads are used to permit a relatively narrow nut. That is, it is preferable that the nut thread extends substantially entirely about the nut's outer circumference so that the nut remains balanced during the chuck's operation. Where a single female/male thread pair is used, the male thread about the nut's circumference would require that the nut be longer in the axial direction than where the three-thread configuration is used. Nevertheless, it should be understood that the present invention encompasses other thread configurations, for example one-thread, two-thread and four-thread arrangements.

Figure 2B:
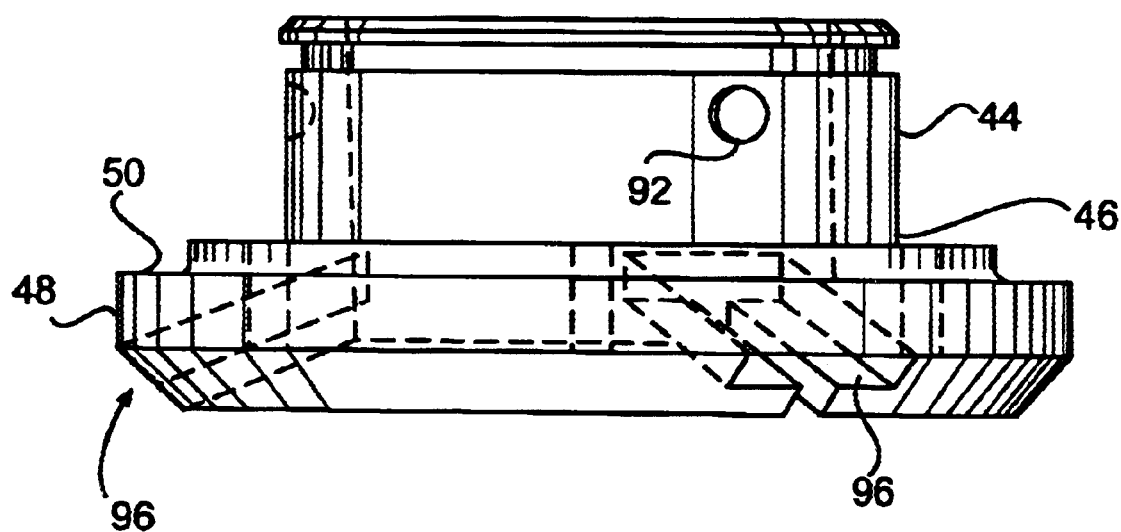
FIG. 2B is a plan view of a thrust plate of the chuck of FIG. 1.
Figure 3A:
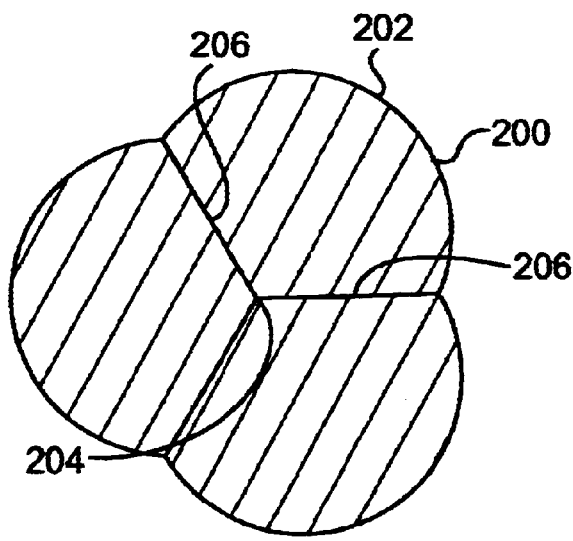
FIG. 3A is a cross-sectional view of prior art chuck jaws.
Figure 3B:
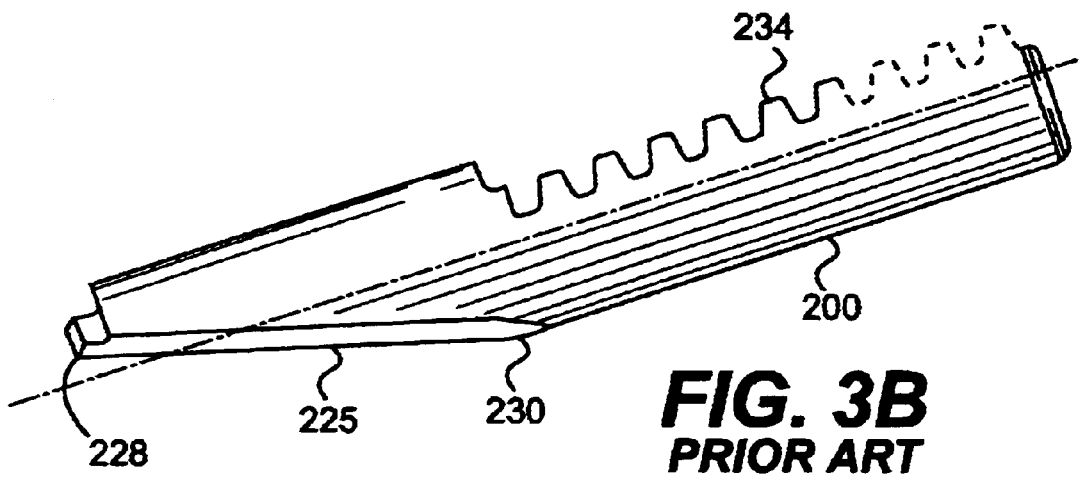
FIG. 3B is a plan view of a prior art chuck jaw.
Figure 3C:
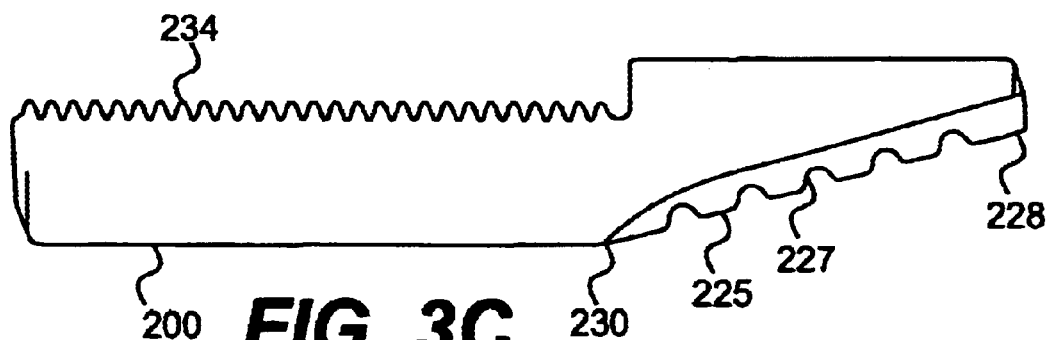
FIG. 3C is a plan view of another prior art chuck jaw.

Thrust plate 46 is axially movably disposed about chuck body 16. Referring also to FIG. 2B, thrust plate 46 defines a body portion 44 that extends axially rearward from a flange portion 48. Nut 32 is slideably received over body portion 44. Flange 48 extends radially outward from body portion 44 and defines a ledge 50 upon which a bearing assembly 52 is received between the thrust plate and the nut. Referring again to FIG. 2A, bearing assembly 52 includes a first race 54 having recesses 56 defined about the radially outward edge of its rearward face. An opposite race 58 includes a shroud 60 extending axially forward therefrom. The shroud defines a plurality of circumferentially extending spring arms 62 biased axially forward toward first race 54 so that tabs 64 defined at the distal ends of arms 62 engage respective recesses 56. When, as described below, nut 32 rotates with respect to thrust plate 46, frictional forces between first race 54 and thrust plate 46 and between opposing race 58 and nut 32 overcome the link between races 58 and 54 provided by the engagement of tabs 64 in recesses 56. Thus, spring arms 62 are deflected so that each tab 64 moves out of its recess 56 and into the next recess. Continued rotation of nut 32 with respect to thrust plate 46 moves tabs 64 in and out of successive recesses, creating an audible sound to notify the user that the chuck is approaching a fully closed position.

Nut 32 is held rotationally with respect to thrust plate 46 by a torsion spring 80. Torsion spring 80 includes ends 82 and 84 that are received in opposing holes 86 and 88, defined respectively in the thrust plate and the nut.

A detent ball 90 is received in any of three depressions 92 in thrust plate body section 44, depending on the holes 86 and 88 that receive the torsion spring ends, so that ball 90 is received in a groove 94 in the inner diameter of nut 32. Ball 90 provides a stop against the edges of groove 94, thereby limiting the range over which nut 32 can rotate with respect to the thrust plate and the chuck body. During normal operation and before the chuck closes onto a tool shank, ball 90 preferably sits against a side of groove 94 so that, when the chuck closes onto a tool shank, rotation of nut 32 is permitted through the full angular width of groove 94. It should be understood that the length of groove 94 may be modified as desired to permit a greater degree of rotational movement of nut 32 with respect to thrust plate 46. For example, in one preferred embodiment, the angular width of groove 94 is approximately 240 degrees.

Referring again to FIG. 2B, thrust plate radial slots 96 are generally T-shaped and are equiangularly spaced apart to receive jaw ends 35. Each pair of jaw ends 35 are formed in a corresponding T-shape so that each slot 96 slidably receives a respective chuck jaw. The slots allow the jaw ends to move radially as the thrust plate moves axially with respect to the chuck body to move the jaws between open and closed positions. A dry lubricant coating may be provided on ends 35 and slots 96 to facilitate this movement. The cooperation between the jaw ends and slots 96 maintains jaws at the proper angle with respect to the thrust plate so that the jaws are maintained in alignment in their respective jaw passageways 30. It should be understood that various jaw end and slot configurations are contemplated by the present invention. For example, the jaw ends may define a semicircular cross-section that is received within a correspondingly shaped radial bore in the thrust plate. In another embodiment, the jaw ends may extend axially through and rearward of the thrust plate and be held in place by a garter spring or other suitable mechanism.

Referring again to FIGS. 1 and 2A, body nose section 20 includes threads 100 that engage threads 102 at a front end of sleeve 12. In the illustrated embodiment, threads 102 are formed about the inner circumference of a metallic insert 104. The outer surface of insert 104 is knurled at 106 and is received at the forward end of sleeve 12 in a press fit at 108. Threads 100 and 102 form a secondary threaded tightening mechanism having a higher pitch than the primary threaded tightening mechanism formed between threads 38 and 42.

Because jaws 18 are received in jaw passageways 30 defined in the chuck body, the jaws are constrained from rotation about the chuck's axis. The receipt of jaw ends 35 by thrust plate slots 96 rotationally holds thrust plate 46 with respect to chuck body 16. When the chuck is between its fully open position and a fully closed position defined when the chuck jaws are closed on each other or on a tool, friction between nut threads 42 and sleeve threads 38 is insufficient to rotate nut 32 with respect to thrust plate 46 against the force of torsion spring 80. Thus, in operation, rotation of sleeve 12 in a clockwise direction (when viewed from the front of chuck 10) moves nut 32 axially forward with respect to the sleeve and the chuck body as indicated at arrow 118 (FIG. 1). As nut 32 presses forward against thrust plate 46 through bearing assembly 52, it moves the bearing assembly forward with respect to body 16. Thrust plate 46, in turn, drives jaws 18 axially forward in their respective passageways 30, thereby moving the chuck toward a closed position. Rotation of sleeve 12 in the opposite direction moves nut 32 axially rearward with respect to the sleeve and the chuck body, as indicated by arrow 120. Nut 32 is restrained in the axially rearward direction with respect to thrust plate 46 by a snap ring 105. Thus, as nut 32 moves in direction 120, it carries thrust plate 46 and jaws 18 axially rearward toward the chuck's open position.

Sleeve threads 102 also rotate about body threads 100 as sleeve 12 rotates with respect to the chuck body. Threads 102 are in the opposite direction of threads 38, and threads 100 are in the opposite direction of threads 42. Thus, as sleeve 12 rotates in the clockwise direction, sleeve 12 moves on threads 100 axially forward with respect to the chuck body in direction 118. When sleeve 12 is rotated in the opposite direction, the sleeve moves rearwardly on threads 100 in direction 120.

Accordingly, when sleeve 12 is rotated in the closing direction, nut 32 moves forward in direction 118 within the sleeve, while sleeve 12 simultaneously moves forward in direction 118 with respect to the body on body threads 100. Because threads 102 and 100 define a higher pitch than threads 38 and 42, nut 32 moves forward with respect to the sleeve faster than sleeve 12 moves forward with respect to the chuck body. For example, in the one pitch configuration illustrated in FIG. 1, approximately two full rotations of sleeve 12 are required to move nut 32 from its rearward most position with respect to the sleeve to its forward most position where the chuck jaws tighten against each other. In these two turns, sleeve 12 moves only $\frac{1}{16}^{th}$ inch forward on body 16.

When sleeve 12 is rotated such that jaws 18 close onto a tool shank, jaws 18, thrust plate 46, and nut 32 are unable to continue their forward axial movement. Accordingly, continued rotation of sleeve 12 tightens thread 38 against thread 42. The frictional force between threads 38 and 42 overcomes the resistance of torsion spring 80, and nut 32 and sleeve 12 rotate with respect to the thrust plate and the chuck body. This rotation carries sleeve 12 forward on body threads 100, thereby pressing nut 32 forward against thrust plate 46 through bearing assembly 52. The thrust plate, in turn, further presses jaws 18 onto the tool. As discussed above, relative rotation between nut 32 and thrust plate 46 produces an audible sound from bearing 52 and is limited by the angular width of nut groove 94.

As threads 102 tighten onto threads 100, the forward force of sleeve 12 against nut 32 further tightens threads 38 and 42. This further overcomes the force applied by torsion spring 80. Thus, when the operator releases sleeve 12, the sleeve and nut remain in their tightened rotational positions with respect to the chuck body.

Accordingly, chuck 10 includes a primary tightening mechanism and a secondary tightening mechanism. The primary tightening mechanism, threads 38 and 42, rapidly moves jaws 18 radially toward and away from the chuck axis. The low pitch of these threads however, reduces the mechanical advantage as the jaws tighten onto the tool. A higher advantage is supplied by the higher-pitch threads 102 and 100, and it is this secondary tightening that finally tightens jaws 18 onto the tool shank.

To open the chuck, the operator rotates sleeve 12 in the opening direction. Sleeve 12 moves axially rearward in direction 120 with respect to chuck body 16 on threads 100. This releases the wedge between threads 38 and 42, thereby allowing torsion spring 80 to carry the nut back to its original rotational position with respect to the thrust plate 46 and the chuck body. Continued rotation of sleeve 12 moves the nut. thrust plate, and jaws axially rearward and away from the tool shank.

Figure 4:
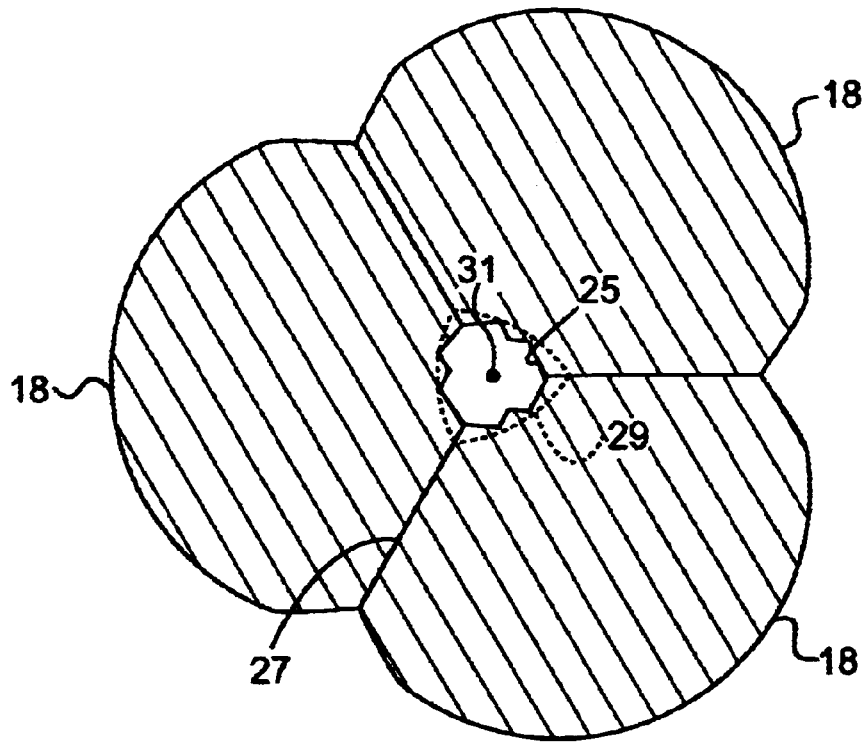
FIGS. 4 and 5 are cross-sectional views of jaws for use in a chuck constructed in accordance with an embodiment of the present invention.

FIGS. 4–7 illustrate chuck jaws in accordance with preferred embodiments of the present invention. FIG. 4 illustrates three chuck jaws 18 in a fully closed position of a drill chuck. Each jaw has a tool engaging face 25 that forms a generally W-shaped tool engaging face between the jaw's side faces 27 so that when adjacent side faces 27 abut each other in the fully closed position, the three tool engaging jaw surfaces 25 converge to form a polygonal aperture about chuck axis 31. A helical grind 29 defined in each tool engaging jaw face 25 is shown in phantom and is described in more detail below. It should be understood that tool engaging jaw face 25 may be formed in any suitable cross-sectional shape, for example in a convex ellipse, flat (FIG. 5), v-shaped, w-shaped, or a concave variation.

Figure 5:
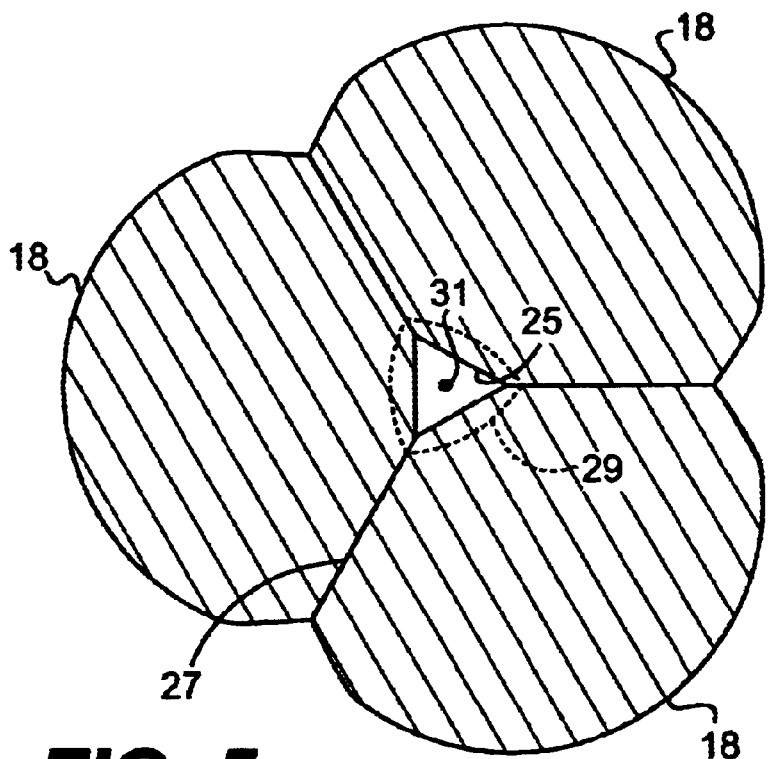

Referring now to FIG. 5, each jaw 18 defines a generally planar or flat tool engaging jaw face 25 so that, in the closed position, as shown, the tool engaging faces form a triangular shaped aperture about axis 31. A helical grind 29. (shown in phantom) is defined in each jaw face 25. It should be understood that the helical grind applied to each tool engaging jaw face may vary according to a variety of parameters. For example, the distance between the tool engaging face and the chuck axis at the time the grind is applied may determine the depth of the grind in each jaw face. Accordingly, depending on the relative height of the center peak with respect to the outer peaks of each jaw, and/or on the design of the jaw ridges, fewer than all the ridges may receive the helical grind, if desired.

Figure 6:
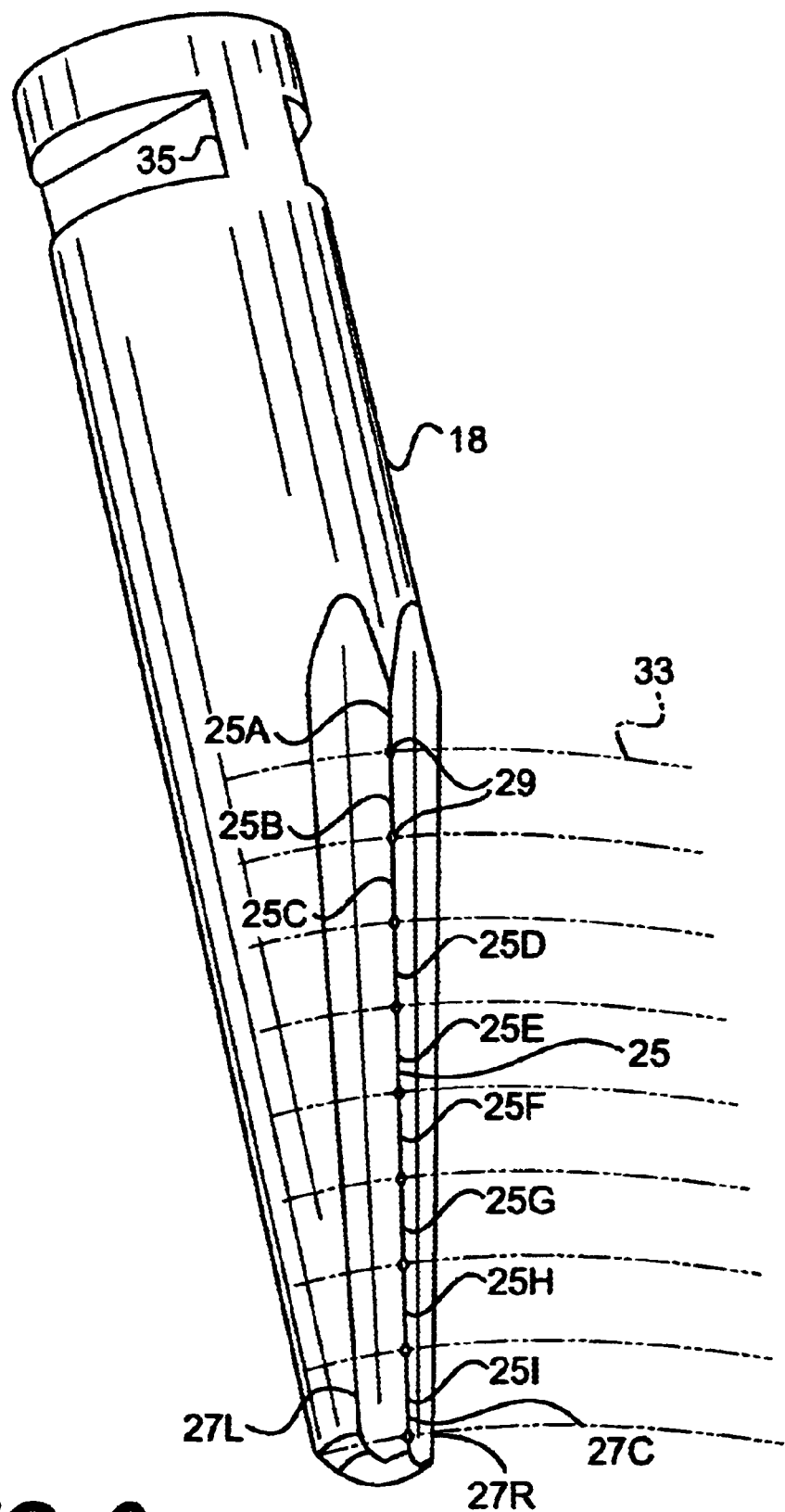
FIG. 6 is a perspective view of a chuck jaw in accordance with an embodiment of the present invention showing a helical grind and the path of a grinding burr.

Referring now to FIG. 6, a chuck jaw 18 defines a generally W-shaped tool engaging jaw face 25 having a series of helical grinds 29 on the center ridge. Thus, chuck jaw 18 may contact a tool shank at nine separate tool engaging jaw portions 25A–25I. Additionally, as noted above, the jaws in FIG. 6 may have different W-shaped tool engaging jaw faces such that the faces may include three grinds 29 for each helical path 33 illustrated. For example, each of three ridges 27R, 27C, and 27L could define a portion of the helical grind 29. A characteristic of the helical grind is that the grind imparted to each ridge 27L, 27C, and 27R is defined at a different axial position on the chuck jaw.

Figure 7A:
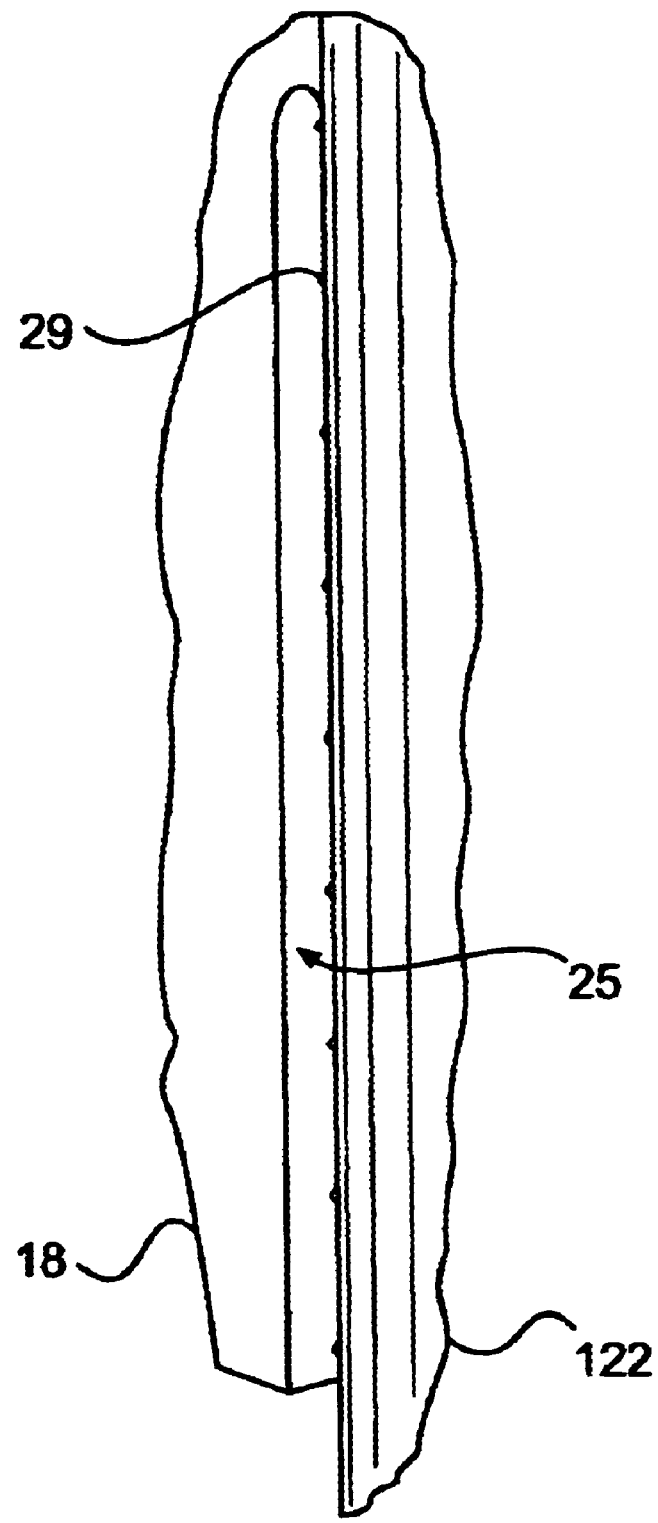
FIG. 7A is a plan view, partly in section, of a chuck jaw in accordance with an embodiment of the present invention in engagement with a tool shank.

Referring now to FIG. 7A, helical grinds 29 form a generally triangular shaped cut in tool engaging jaw face 25. However, it should be understood that the shape of cut or grind will be largely determined by the shape of the grinding burr, and that other dimensionally configured cuts are contemplated by the present invention, for example, a square cut, a concave cut, or the like. Grinds 29 are preferably approximately 0.020 to 0.030 inches in depth. Accordingly, as this represents a very small dimension, it should be understood that the grinds shown in the present Figures may not be to scale. Additionally, it should be understood that helical grinds 29 could be less than 0.020 inches, or greater than 0.030 inches in depth, and that the depth of the grind may vary from jaw to adjacent jaw, or within the same or separate ridges of a single jaw.

Figure 7B:
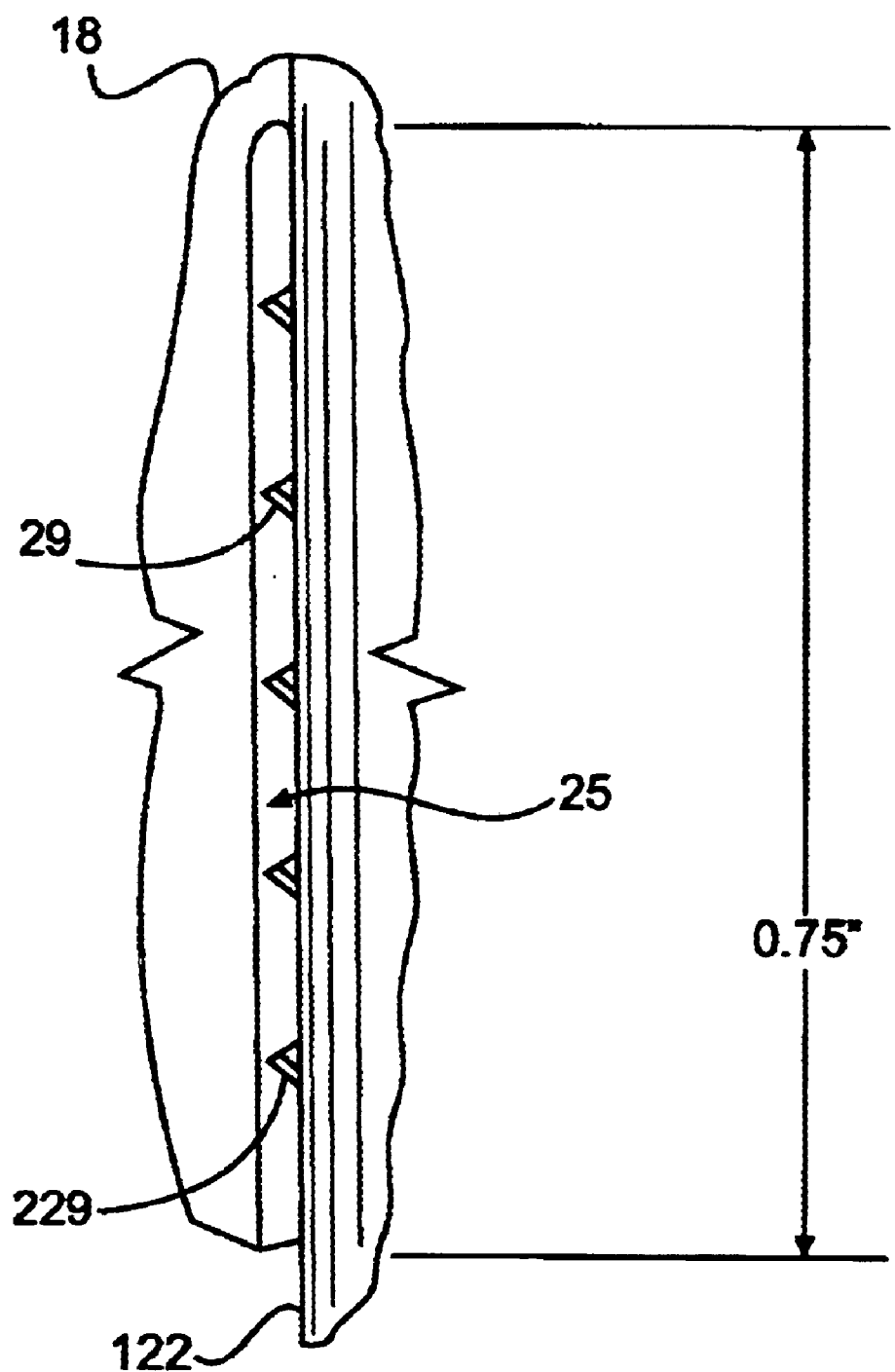
FIG. 7B is a plan view, partly in section, of a chuck jaw in accordance with another embodiment of the present invention in engagement with a tool shank.

FIG. 7B illustrates another embodiment of chuck jaw 18. As shown, the tool engaging jaw face 25 is approximately 0.75 inches and each grind 29 is approximately 0.125 apart, representing an eight pitch helical grind. Additionally, FIG. 7B illustrates at 229 that, when viewed from the side, at least a portion of each helical grind 29 defined in jaw face 25 is visible. This is due to the simultaneous axial and rotational movement of the assembled chuck with respect to the grinding burr.

Figure 8A:
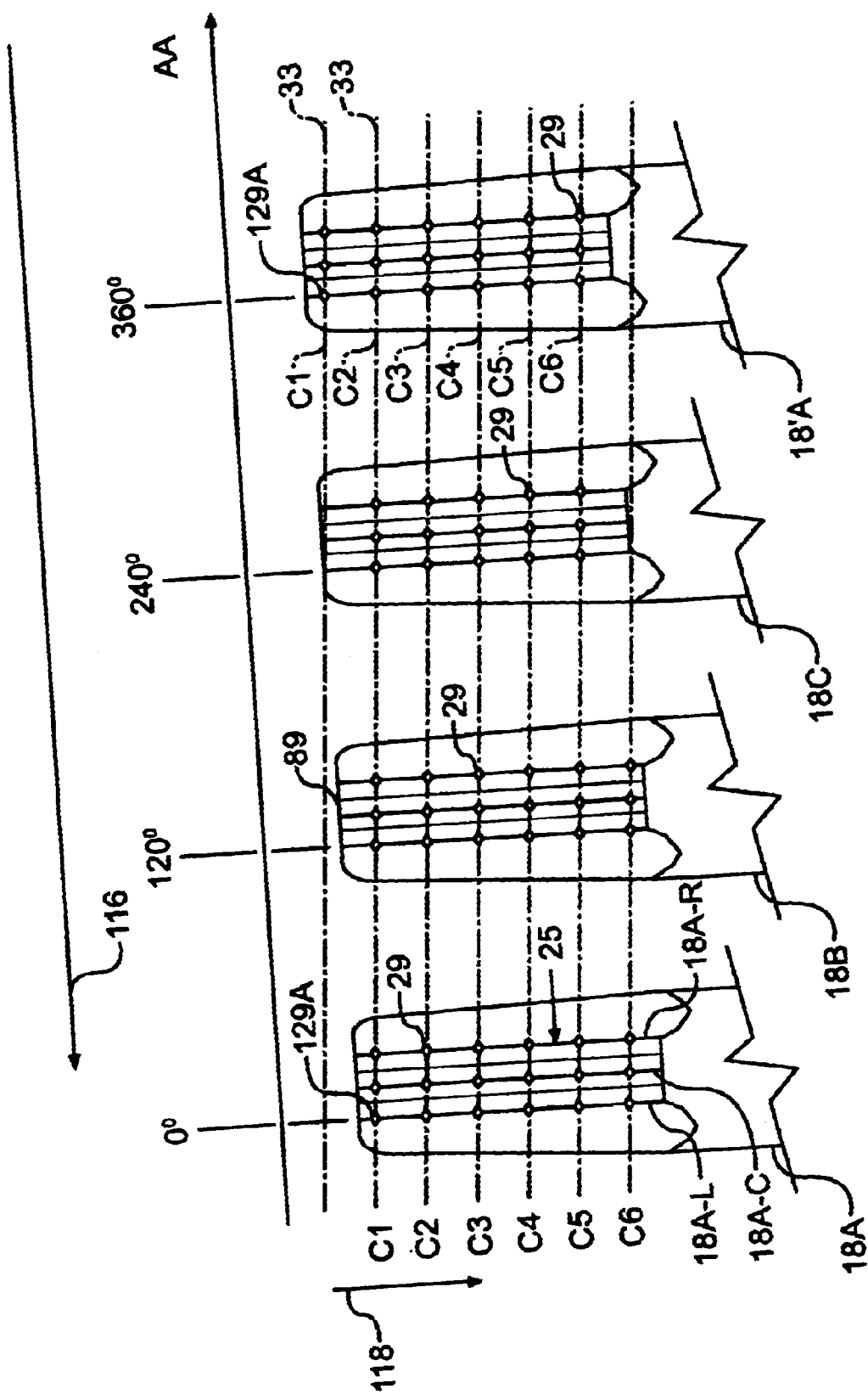
FIG. 8A is a panoramic view from the chuck axis, partly in section, of chuck jaws in accordance with an embodiment of the present invention showing a helical grinding path.

FIG. 8A illustrates a method of application of a helical grind 29 to the chuck jaws. Line AA roughly corresponds to path 33 (FIG. 6) and represents the angular distance that a helical grinding device travels with respect to the jaws during application of the grind (see FIG. 8D). Line AA generally follows a circumference defined by the jaws' tool engaging surfaces at some predetermined jaw position between the fully opened and fully closed positions, for example where the jaws define a circumference having a 0.25 inch diameter about axis 31. The predetermined position may vary, however, and may for example be chosen to correspond to a common diameter of a tool shank size typically used with the chuck.

Figure 8B:
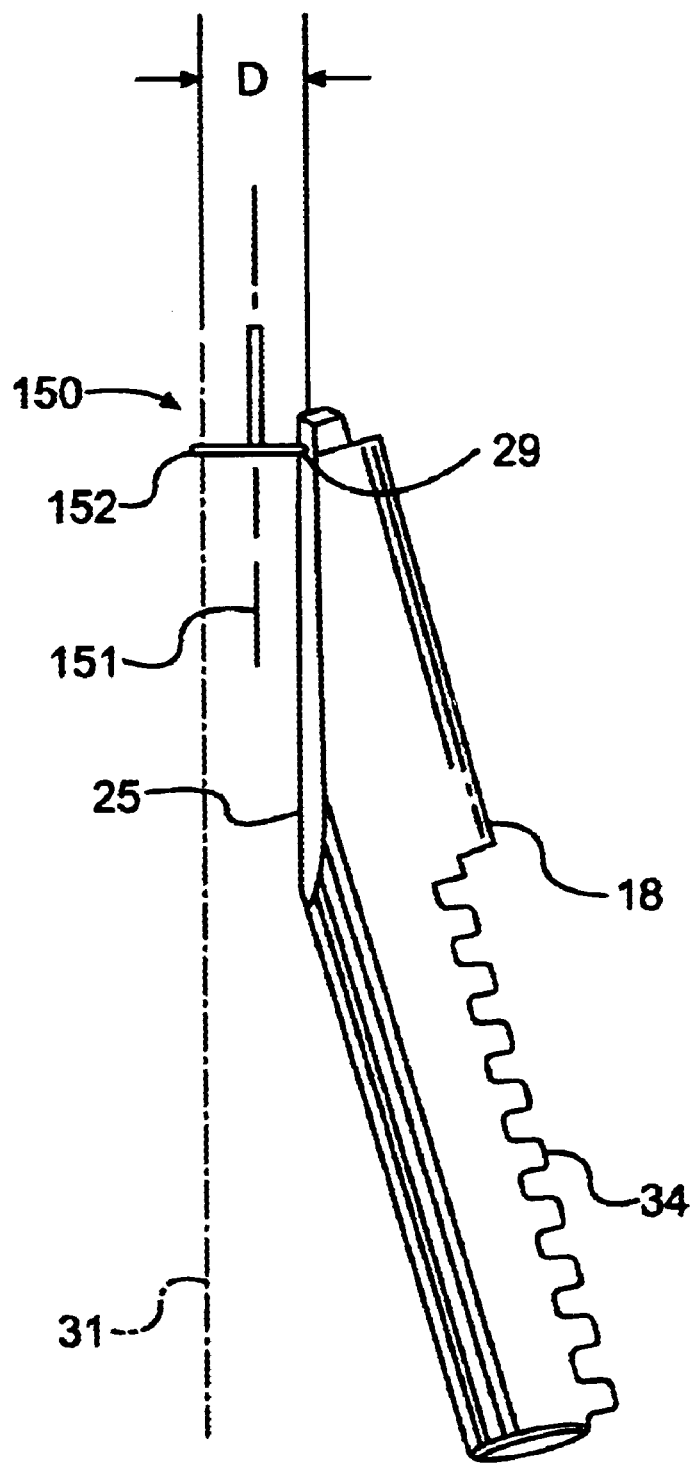
FIG. 8B is a schematic view of a chuck jaw and a grinding burr in accordance with an embodiment of the present invention.
Figure 8C:
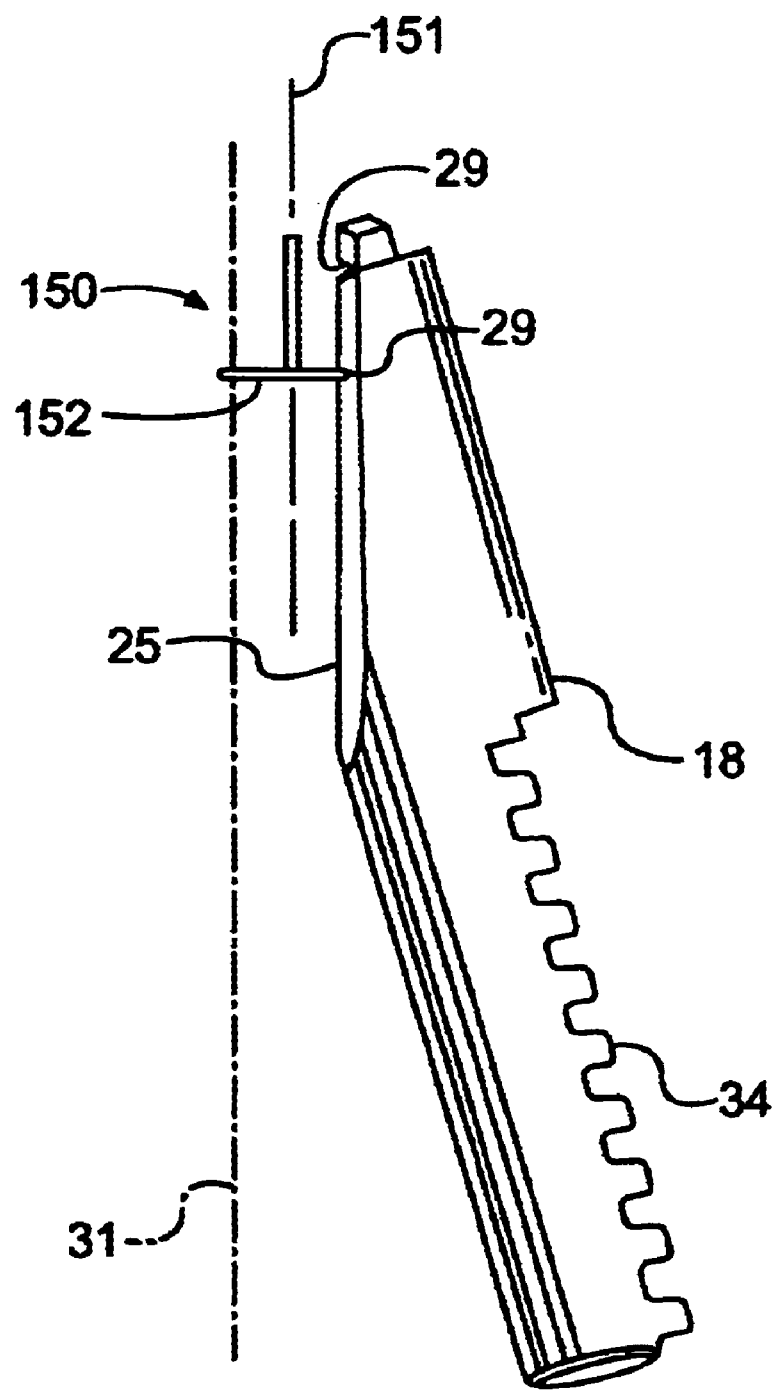
FIG. 8C is a schematic view of a chuck jaw and a grinding burr in accordance with an embodiment of the present invention.
Figure 8D:
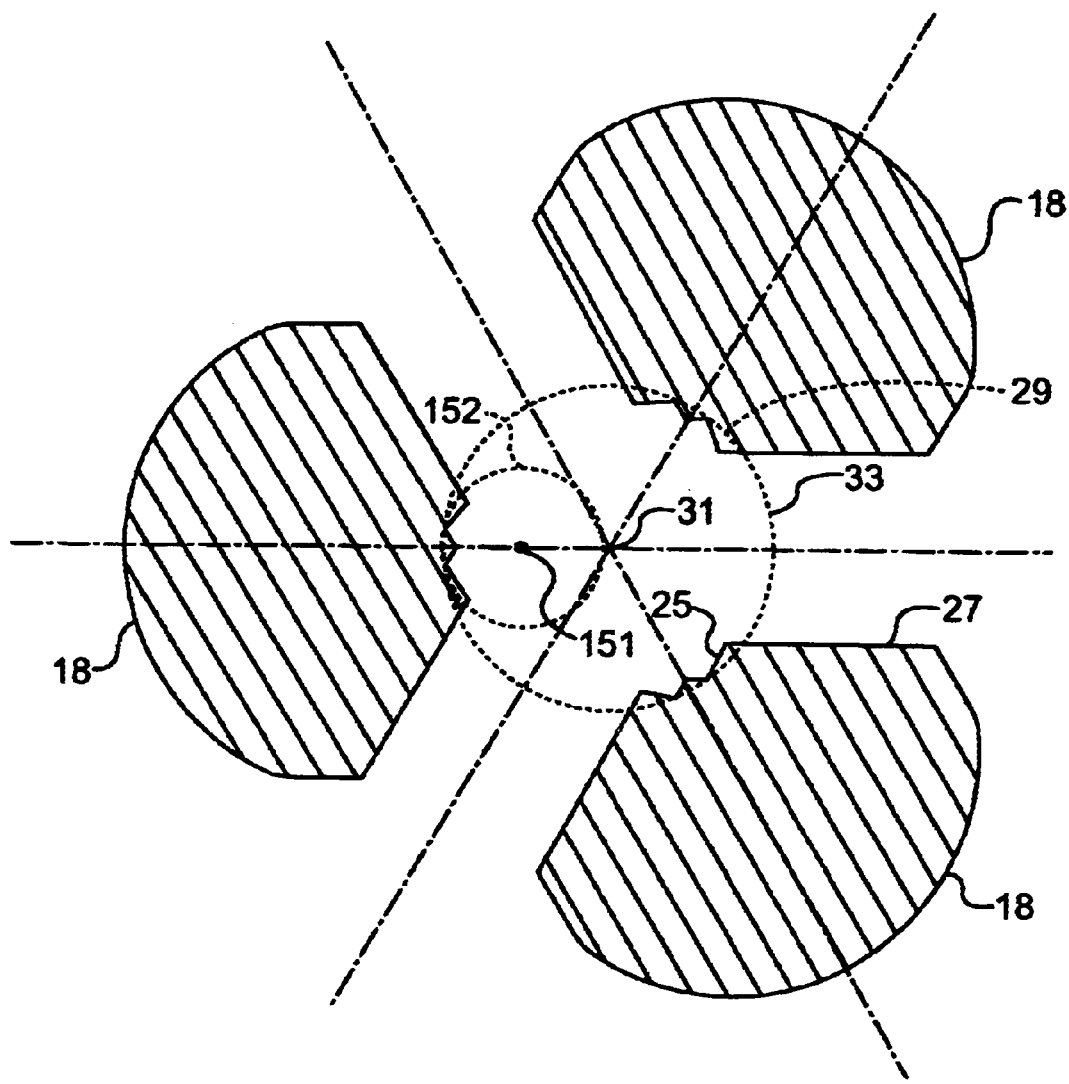
FIG. 8D is a cross-sectional schematic view, of a jaw grinding tool and chuck jaws in accordance with an embodiment of the present invention.

Tool engaging jaw face 25 of chuck jaw 18A includes three ridge portions, 18A–L, 18A–C, and 18A–R. The angular distance between a left side edge of the left outer ridge of each jaw is approximately 120 degrees, and each outer ridge is marked zero degrees, 120 degrees, 240 degrees, and 360 degrees, respectively, where the 360 degree mark represents one full rotation of the assembled chuck during application of the helical grind. To illustrate the method of applying helical jaw bite 29 to chuck jaws 18, a fourth jaw 18A' is also illustrated. It should be understood, however, that fourth jaw 18A' is a repetition of jaw 18A and is included to show the progression of the helical jaw grind 29 between adjacent jaws. Generally diamond shaped markings 29 (FIGS. 8A–8C) indicate the imparted grind on tool engaging jaw faces 25. Referring also to FIG. 8D, the circumferential path of a grinding burr 152 is shown at 33. Each rotation of the assembled chuck with respect to a grinding tool 150 is numbered on the left side of identical jaws 18A and 18A'. It should be understood that grind portion 129A of jaw 18A and jaw 18A' represents the same grind.

In one preferred method, prior to applying the grind, the assembled chuck is adjusted so that the jaws are approximately one-quarter inch open, such that each tool engaging jaw face is approximately one-eighth of an inch from chuck axis 31. A rotational axis 151 of jaw grinding tool 150 (shown schematically in FIGS. 8B–8D) is offset between chuck axis 31 and tool engaging faces 25 about the forward end 89 of chuck jaws 18. The assembled chuck is then simultaneously moved axially with respect to tool 150 and rotated about its axis 31. Preferably, cutting tool 150 defines a limited cutting surface, axially speaking, so that it with each rotation of a chuck jaw 18 with respect to cutting tool 150, cutting burr 152 cuts a grind 29 approximately as shown in FIGS. 8B and 8C. When cutting burr 152 defines a greater cutting surface in the axial distance, the resultant helical cut would be longer (axially) than it is deep, whereas in FIGS. 8B and 8C, grind 29 defines approximately equivalent axial length and radial depth. Thus, cutting burr 152 cuts a helical pattern as it is moved axially with respect to the rotating chuck and jaws, resulting in the grinds 29 along path 33 as shown in FIG. 8A.

Grinding tool 150 is typically held axially stationary and rotates about its axis 151 as the assembled chuck is moved axially with respect to the grinding tool. It should be understood, however, that the assembled chuck could be rotated about its axis while held in the same axial position and that the grinding tool could be moved in the axial direction with respect to the assembled chuck. As should be further understood in this art, rotational and axial speeds of the assembled chuck can be consistently and accurately controlled during application of the helical grind. The cutting surface of cutting burr 152 may be formed of diamond, carbide or other suitable material.

As mentioned above, axis 151 of grinding burr 152 is adjustable to varying radial distances from chuck axis 31 so that grinding tool 150 can be used to grind chuck jaws at different positions and at different depths. For example, if a 0.25 inch diameter grinding burr 152 is utilized, the chuck jaws may be opened to a three-eighths of an inch, and axis 151 of grinding burr 152 can be adjusted accordingly to be approximately 0.0825 inches from chuck axis 31 to impart a 0.020 inch grind [(3/8)/2+0.020=0.2075; 0.2075−(0.25/2)= 0.825]. Thus, the outer radial cutting edge of grinding burr 152 may be adjusted as desired over varying radial distances with respect to chuck axis 31. For example the distance D (FIG. 8B) is approximately 0.145 inches in one preferred embodiment.

When applying a helical jaw grind 29, the assembled chuck, and therefore each chuck jaw, typically moves in the (rotational) direction indicated by arrow 116 of FIG. 8A. Accordingly, grinding tool 150 typically moves in the direction indicated by arrow 118 with respect to the chuck jaws to produce the helical grind illustrated in FIG. 8A.

As discussed above, this method permits the application of a helical grind to a tool engaging jaw surface over varying parameters. For example, the grinding burr could be disposed axially rearward of the tool engaging jaw surfaces prior to application of the grind and the assembled chuck could be moved axially rearward toward cutting tool 150. In the preferred method discussed above, where the chuck jaws are opened approximately one quarter of an inch (0.25 inches) so that each tool engaging jaw face 25 is approximately one-eighth of an inch from chuck axis 31, the radial distance D as shown in FIG. 8B generally ranges from 0.145 to 0.155 inches in order to impart a helical grind to the chuck jaws having the preferred depth of 0.020 to 0.030 inches. To produce an eight pitch helical grind, the assembled chuck could rotate eight revolutions per minute and move axially one inch per minute with respect to the grinding burr, or the chuck could rotate once each minute and move axially one-eighth of an inch per minute with respect to the grinding burr. Thus, it should be understood that varying combinations of rotational and axial speeds could be employed to produce varying pitch configurations and grind depths and, further, that the method is applicable to any suitable tool engaging jaw surface configuration. It should be further understood that the axial or rotational speeds of the assembled chuck could vary during application of the grind to produce an asymmetrical helical grind.

Figure 9:
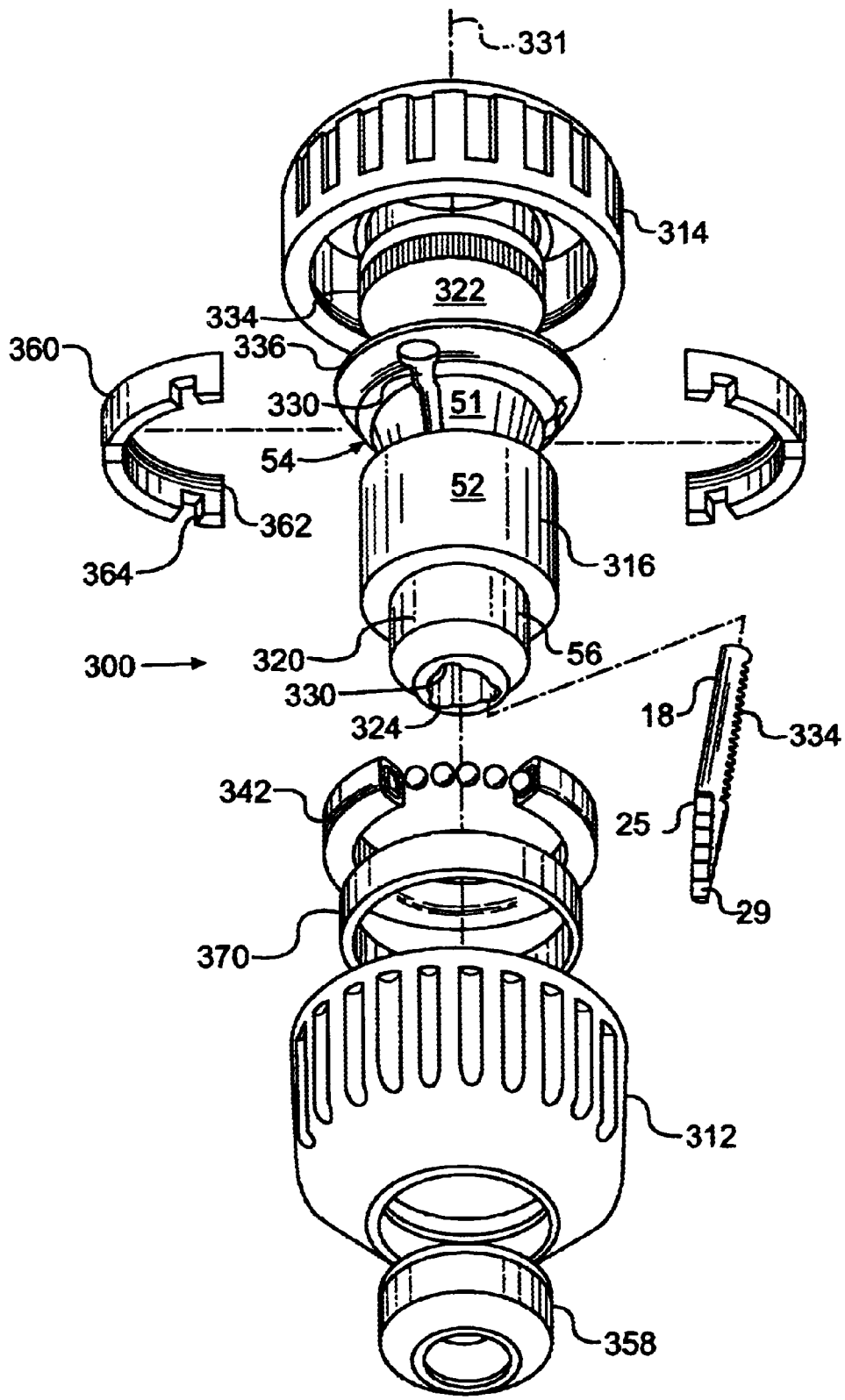
FIG. 9 is an exploded view of a chuck constructed in accordance with an embodiment of the present invention.

The chuck jaws described herein may be used with a variety of chuck configurations. For example, referring to FIG. 9, a chuck 300 having jaws 18 as described above includes a front sleeve 312, and an optional rear sleeve 314. A body 316 is generally cylindrical in shape and includes a nose or forward section 320 and a tail or rearward section 322. An axial bore 324 is formed in the nose section and is somewhat larger than the largest tool shank that the chuck is designed to accommodate. As should be understood in this art, body 316 may be formed from steel bar stock or any other suitable material.

A nose piece 358 is press fit to body nose section 320 to hold front sleeve 312 against movement in the axially forward direction with respect to chuck body 316. A split nut 360 is disposed about chuck body 316 and defines threads 362 about its inner circumference. Threads 362 engage threads 334 on jaws 18 to drive jaws 18 toward and away from chuck axis 331 within respective passageways 330. As shown, nut 360 defines a plurality of recesses 364 that receive corresponding drive dogs (not shown) defined about the inner circumference of front sleeve 312 so that front sleeve 312 rotationally drives nut 360. A bearing assembly 342 is disposed between nut 360 and thrust ring 336. Optional rear sleeve 314 may be axially and rotationally fixed to chuck body tail section 322 via a knurled interface at 344.

In operation, relative rotation between front sleeve 312 and chuck body.316 rotates nut 360 with respect to the chuck body to drive chuck jaws 18 toward or away from the chuck axis, depending upon the relative rotational direction. If rear sleeve 314 is employed, an operator may grasp the outer surface of sleeve 314 and rotate front sleeve 312 with respect to the rear sleeve to drive jaws 18 within passageways 330 to open or close the chuck.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal and equivalent scope of the appended claims.

What is claimed is:

1. A chuck for use with a manual or powered driver having a rotatable drive shaft, said chuck comprising:
   a generally cylindrical body having a nose section and a tail section, said tail section being configured to rotate with said drive shaft and said nose section having an axial bore formed therein; and
   a plurality of jaws movably disposed with respect to said body toward and away from said axial bore, wherein each said jaw includes
      a back surface,
      a longitudinal tool engaging ridge opposite said back surface and disposed facing generally parallel to the axis of said axial bore, and
      a plurality of grinds formed in said longitudinal tool engaging ridge,
   wherein said plurality of grinds form a plurality of elongated longitudinal tool engaging ridges, and wherein said grinds are formed along a helical pattern on said tool engaging jaw ridges when said tool engaging ridges are disposed at a predetermined position with respect to the axis of said axial bore.

2. The chuck as in claim 1, wherein each said jaw includes a first side surface extending from said tool engaging surface toward said back surface and a second side surface extending from said tool engaging surface toward said back surface, and wherein said first side surface and said second side surface are disposed on either side of a plane that includes said axis.

3. The chuck as in claim 2, wherein said first side surface and said second side surface define an angle through said jaw between said side surfaces that is equal to 120 degrees.

4. The chuck as in claim 2, wherein said tool engaging surface of each said jaw is defined by a ridge parallel to said axis and wherein said side surfaces meet at said ridge.

5. The chuck as in claim 2, wherein at least a portion of each said tool engaging surface of each said jaw is defined by an inner ridge parallel to said axis, a first outer ridge parallel to said inner ridge, a second outer ridge parallel to said inner ridge, and a pair of troughs defined respectively between said inner ridge and said first and second outer ridges so that at least a portion of each said tool engaging surface defines a W-shaped cross-section, and wherein said first side surface extends toward said back surface from said first outer ridge and said second side surface extends toward said back surface from said second outer ridge.

6. The chuck as in claim 5, wherein said grind is defined at least in said inner ridge.

7. The chuck as in claim 1, wherein at least a portion of each said tool engaging surface of each said jaw is defined by a flat planar surface parallel to said axis.

8. The chuck as in claim 7, wherein each said grind extends completely across said flat planar surface.

9. The chuck as in claim 2, wherein each grind at said first side surface is closer to a forward end of each said chuck jaw than a corresponding portion of said grind at said second side surface.

10. The chuck as in claim 5, including a nut disposed about said body in communication with said jaws, and a generally cylindrical sleeve disposed about said body in communication with said nut, wherein rotation of one of said nut and said sleeve with respect to said body drives said jaws toward or away from the axis of said axial bore, and wherein each said jaw defines a forward end and a rearward end, said forward end defining said tool engaging surface and said rearward end is in driving communication with said nut.

11. The chuck as in claim 1, wherein said body nose section includes a plurality of angularly disposed passageways formed therethrough and intersecting said axial bore, and wherein each said jaw is disposed in a respective said passageway.

12. The chuck as in claim 10, wherein each said jaw includes threads defined on said rearward end, wherein said nut includes threads on an inner circumferential surface in engagement with said threads on said jaws so that rotation of said nut with respect to said body moves said jaws axially in said passageways, and wherein said sleeve is in rotationally driving engagement with said nut.

13. The chuck as in claim 10,
including a nut axially movably disposed about said body in driving engagement with said jaws so that axial movement of said nut with respect to said body moves said jaws toward or away from the axis of said axial bore,
wherein said nut defines a threaded outer circumferential surface and said sleeve is rotatably mounted about said body and defines a threaded inner circumferential surface engaging said threaded outer surface of said nut so that relative rotation between said nut and said sleeve moves said nut axially with respect to said body.

14. The chuck as in claims 13, wherein said body nose section includes a thread and said sleeve defines a second thread at its forward end in engagement with said nose section thread, and wherein rotation of said sleeve with respect to said body in a direction to move said jaws toward said axis causes said sleeve to move axially forward with respect to said body on said body nose thread.

15. The chuck as in claim 1, wherein each said tool engaging surface defines approximately eight said corresponding grind portions per axial inch of said tool engaging surface.

16. The chuck as in claim 1, wherein each said grind extends into each said tool engaging surface a distance of at least 0.010 inches.

17. The chuck as in claim 1, wherein each said grind extends into each said jaw a distance of at least 0.015 inches.

18. The chuck as in claim 1, wherein each said grind extends into each said jaw a distance of at least 0.020 inches but not greater than 0.030 inches.

19. The chuck as in claim 1, wherein said predetermined position is defined when each said tool engaging jaw face is disposed approximately 0.125 inches from the axis of said axial bore.

20. A chuck for use with a manual or powered driver having a rotatable drive shaft, said chuck comprising:
a generally cylindrical body having a nose section and a tail section, said tail section being configured to rotate with said drive shaft, said nose section having an axial bore formed therein and a plurality of angularly disposed passageways formed therethrough and intersecting said axial bore;
a generally cylindrical sleeve disposed about said chuck body;
a threaded nut disposed about said body and in communication with said sleeve; and
a chuck jaw moveably disposed in each said passageway toward and away from said axial bore, wherein each said jaw includes
a back surface opposite a longitudinal tool engaging ridge, a first side surface extending from said longitudinal tool engaging ridge toward said back surface, and a second side surface extending from said longitudinal tool engaging ridge toward said back surface and wherein said first side surface and said second side surface are disposed on either side of a plane that includes said chuck axis, wherein each
said longitudinal tool engaging ridge faces and is generally parallel to the axis of said axial bore, wherein each said longitudinal tool engaging ridge defines a plurality of grinds, wherein each said grind is disposed in a plane that is non-perpendicular to said chuck axis and extends from said first side surface to said second side surface and wherein each said grind at said first side surface is closer to a forward end of each said chuck jaw than a corresponding portion of said grind at said second side surface, and
wherein rotation of one of said nut and said sleeve with respect to said body drives said jaws toward or away from said axial bore.

* * * * *

UNITED STATES PATENT AND TRADEMARK OFFICE
CERTIFICATE OF CORRECTION

PATENT NO. : 6,648,341 B1
DATED : November 18, 2003
INVENTOR(S) : Benjamin A. Gaddis and Philip A. King It is certified that error appears in the above-identified patent and that said Letters Patent is hereby corrected as shown below:

Title page,
Item [75], Inventor, should read -- Philip A. King --

Signed and Sealed this

Twenty-fourth Day of May, 2005

JON W. DUDAS
*Director of the United States Patent and Trademark Office*